La F. BINGHAM.
Manufacture of Hydrogen Gas.

No. 151,557.

2 Sheets--Sheet 1.

Patented June 2, 1874.

WITNESSES
E. H. Bates
Robert Everitt

INVENTOR
La Fayette Bingham
Chipman Hosmer & Co
BY
ATTORNEYS

2 Sheets--Sheet 2.

La F. BINGHAM.
Manufacture of Hydrogen Gas.

No. 151,557. Patented June 2, 1874.

WITNESSES
E. H. Bates
Robert Everett

INVENTOR
La Fayette Bingham
BY Chipman &c.
ATTORNEYS

UNITED STATES PATENT OFFICE.

LA FAYETTE BINGHAM, OF NEW YORK, N. Y.

IMPROVEMENT IN THE MANUFACTURE OF HYDROGEN GAS.

Specification forming part of Letters Patent No. 151,557, dated June 2, 1874; application filed May 9, 1874.

*To all whom it may concern:*

Be it known that I, LA FAYETTE BINGHAM, of New York, in the county of New York and State of New York, have invented a new and valuable Improvement in the Manufacture of Gas; and I do hereby declare that the following is a full, clear, and exact description of the construction and operation of the same, reference being had to the annexed drawings, making a part of this specification, and to the letters and figures of reference marked thereon.

Figure 1:
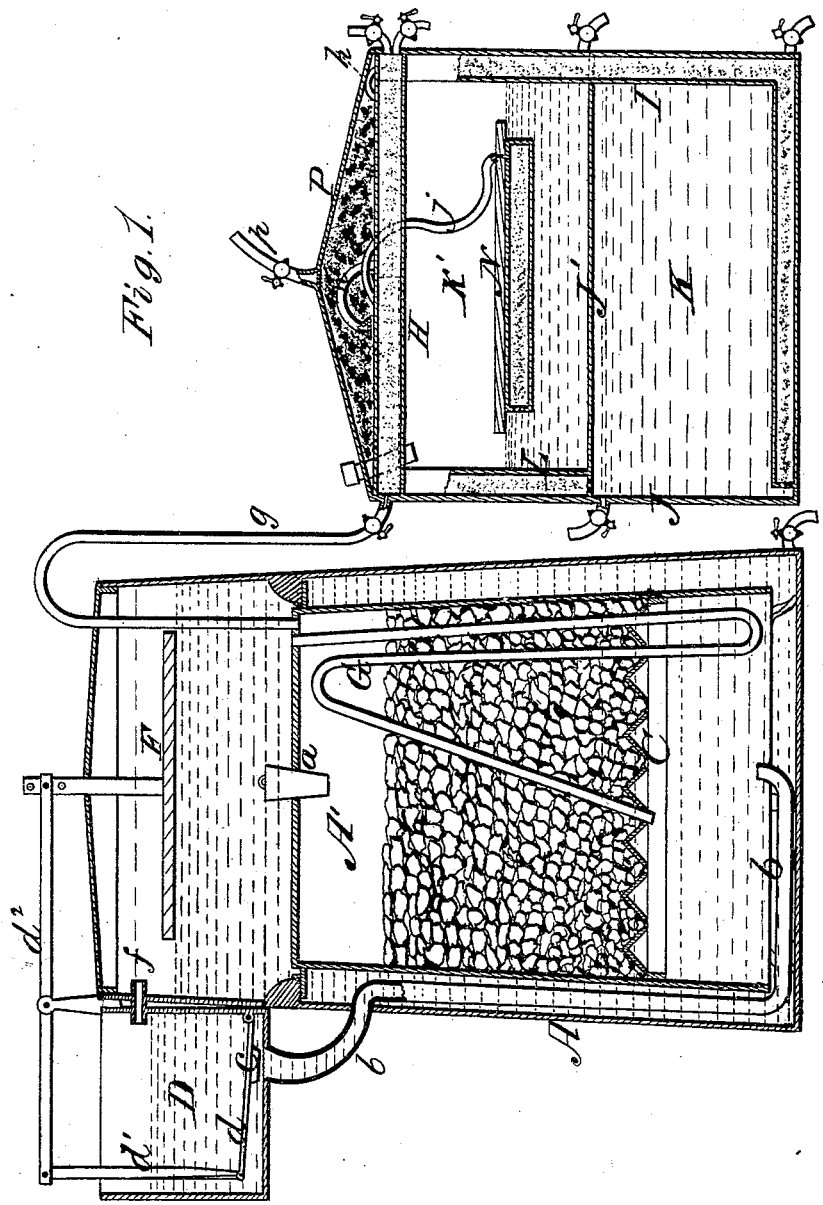
Figure 2:
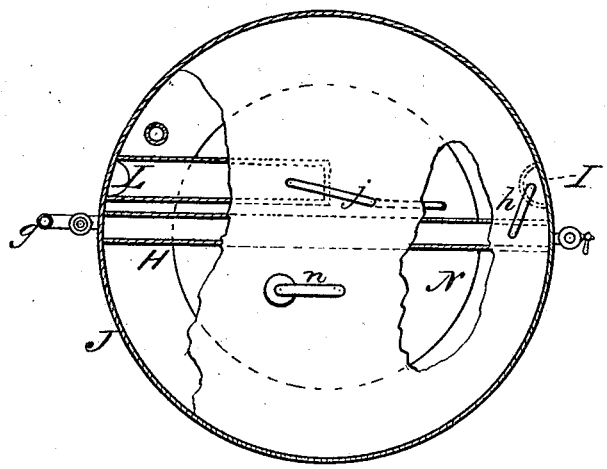

Figure 1 of the drawing is a representation of a sectional view of my machine; and Fig. 2 is a sectional detail view.

This invention has relation to the production of illuminating-gas of a high candle-power, by the passage of hydrogen gas through liquid hydrocarbons.

The nature of my invention consists in combining, with an apparatus for producing hydrogen gas by the decomposition of water, certain mechanism, which will automatically transfer acidulated water from the upper portion of the generator to the lower end of the vessel in which the iron chips are contained, as will be hereinafter explained. It also consists in a novel construction of a carbureter, whereby gas from the generator will first be conducted through water alone, or water containing some good purifier, and thence through pipes containing hemp or other suitable porous substance, and through a crude liquid hydrocarbon, whereby a very rich carbureted, hydrogen gas is produced, as will be hereinafter explained. It also consists in a novel process of manufacturing illuminating-gas by the carbureting of hydrogen gas, whereby the crudest kinds of hydrocarbons can be utilized and employed either alone or with highly-volatile hydrocarbons, as will be hereinafter explained.

I will first describe my improved hydrogen-gas generator, reference being had to Sheet 1 of the annexed drawings.

A designates a vessel, of suitable shape and capacity, which may or may not be covered. Centrally arranged in this vessel is an inverted vessel, A', which is suitably confined in its place, and provided with an opening, $a$, closed by a plug, through which iron chips and turnings are introduced. The mass of chips are supported upon a zigzag or other suitable grating, C, through which acidulated water is free to circulate, and come in contact with the chips. D designates a small vessel, located outside and near the top of the vessel A, and having a pipe, $b$, leading from its bottom and extending beneath the vessel A'. The upper end of the pipe $b$ is constructed with a valve-seat to receive a valve, $c$, which is attached to a vertically-vibrating arm, $d$. This arm is connected by a rod, $d^1$, to a lever, $d^2$, carrying on one end a float, F, which is arranged in the upper end of the vessel A. When the acidulated water rises in vessel A, by the accumulation of gas above the liquid in the vessel A', the float F will close the valve $c$ on its seat, and cease the flow of liquid from the vessel D, and when the accumulation of gas still further increases, the liquid will flow from vessel A into D through an overflow-pipe, $f$. G designates a compound siphon, the shortest leg of which terminates just at the grating C, and the longer leg is bent up through the iron and gas spaces in the vessel A', and terminates at the upper end of the latter. After the valve $c$ is shut by the rise of the float F, as above described, should the gas in the vessel A be still further increased, so as to force the liquid below the lower end of the short leg of the siphon G, liquid will flow into the vessel A' from the upper end of the vessel A through the siphon. By these means the acidulated liquid will be automatically transferred from the upper portion of the vessel to the lower part thereof, said transfer being controlled by the increase and decrease of gas in the space above the iron chips in vessel A'. By such a transfer the acidulated liquid is maintained at, or nearly at, a uniform strength, where it acts on the iron for a considerable length of time.

The siphon G is important for the perfect working of the apparatus, inasmuch as that after the valve $c$ is shut, and the flow through pipe $b$ ceases, the said siphon will then be brought into play, and keep the acidulated liquid at a proper level in vessel A' to act on the iron and produce the gas.

I will here remark that while the gas is being consumed the above-described automatic transfer of the liquid will cease.

The hydrogen gas thus produced will be more or less impure, for which reason I conduct it from the vessel A' to one end of a purifier, H, by means of a pipe, g. This purifier H consists of a tube filled with water, or a solution of lime-chloride, or other suitable substance, which will extract the impurities from the gas. The purifier H extends diametrically across the upper end of a carbureter, J, and is provided with feed and draw-off cocks, (shown in Fig. 1.) The gas, when purified, is conducted into the upper end of a vertical tube, I, by means of a short arched pipe, h, (shown clearly in Fig. 2.) The tube I, which I shall denominate a dry compartment, is filled with a porous substance, and for this purpose I prefer to use curled Tampico hemp. The lower end of the compartment I communicates with a similar compartment, which extends nearly across the bottom of the carbureter J, and is covered, at its end, by means of gauze-wire. The carbureter J is horizontally divided by a partition, J', forming two chambers, K K', the former for containing crude petroleum, and the latter for containing a lighter hydrocarbon. These two chambers are provided with filling and draw-off cocks, (shown in Fig. 1.) After the gas escapes from the dry compartment H, it rises through the body of hydrocarbon in the chamber K, and enters another dry compartment, L, filled with hemp, which conducts the gas to a flexible tube, j, which tube conducts it into one end of a carbureter, N, containing hemp saturated with the lightest part of the hydrocarbon fluid in the chamber K'. The carbureter N will float in the fluid, and the tube j will allow it to rise and descend therein. I thus collect only the finest or lightest portion of the fluid hydrocarbon in chamber K, and enrich the gas to a very high candle-power. The gas escapes from the carbureter N into the chamber K', from which it is conducted, by means of an arched pipe, n, into a chamber, P, at the top of the carbureter. This chamber P I pack with charcoal, and hemp, and lime-chloride, which will purify the gas ready for burning. It is then conducted to the burners by means of a pipe, p, leading out of the upper end of the chamber P.

What I claim as new, and desire to secure by Letters Patent, is—

1. In a hydrogen-gas generator, the process of automatically transferring acidulated water from the upper portion of the generator to the lower portion thereof by means of a valve actuated by a float, substantially as herein described, and for the purpose set forth.

2. The combination of purifiers H, arranged in the top portion of carbureter J, with the dry compartment I and pipe g, substantially as and for the purpose set forth.

3. The carbureter J, having chambers K K' for containing fluid hydrocarbons, in combination with the compartments I and L, packed with hemp or other suitable substance, substantially as described.

4. The chamber P, containing a filling of charcoal, hemp, and lime-chloride, in combination with carbureters J N, constructed and arranged substantially as and for the purposes described.

5. The process described of producing illuminating-gas, consisting in the purification of hydrogen gas by passing it through water, and the subsequent treatment of the gas thus purified by subjecting it to a hydrocarbon suspended in a porous packing, then to a hydrocarbon in a free fluid state, and finally to a purifier consisting of charcoal or other equivalent substance or substances, as herein specified.

In testimony that I claim the above I have hereunto subscribed my name in the presence of two witnesses.

LA FAYETTE BINGHAM.

Witnesses:
GEORGE E. UPHAM,
D. D. KANE.